(12) United States Patent
Usui et al.

(10) Patent No.: US 11,919,175 B2
(45) Date of Patent: Mar. 5, 2024

(54) ROBOTIC SYSTEM WITH COLLISION AVOIDANCE MECHANISM AND METHOD OF OPERATION THEREOF

(71) Applicant: Mujin, Inc., Tokyo (JP)

(72) Inventors: Kei Usui, Tokyo (JP); Rosen Nikolaev Diankov, Tokyo (JP)

(73) Assignee: Mujin, Inc., Tokyo (JP)

( * ) Notice: Subject to any disclaimer, the term of this patent is extended or adjusted under 35 U.S.C. 154(b) by 425 days.

(21) Appl. No.: 17/008,818

(22) Filed: Sep. 1, 2020

(65) Prior Publication Data

US 2021/0323157 A1 Oct. 21, 2021

Related U.S. Application Data

(60) Provisional application No. 63/010,068, filed on Apr. 15, 2020.

(51) Int. Cl.
*B25J 9/16* (2006.01)
*B25J 13/06* (2006.01)

(52) U.S. Cl.
CPC ........... *B25J 9/1676* (2013.01); *B25J 9/1605* (2013.01); *B25J 9/1671* (2013.01); *B25J 13/06* (2013.01)

(58) Field of Classification Search
None
See application file for complete search history.

(56) References Cited

U.S. PATENT DOCUMENTS

| 8,386,080 | B2 | 2/2013 | Bosscher et al. |
| 9,757,858 | B2 | 9/2017 | Eto et al. |
| 10,099,372 | B2 | 10/2018 | Vu et al. |
| 10,131,053 | B1 | 11/2018 | Sampedro et al. |
| 10,576,635 | B2 | 3/2020 | Ogawa et al. |
| 2003/0225479 | A1 | 12/2003 | Waled |

(Continued)

FOREIGN PATENT DOCUMENTS

| CN | 108161904 A | 6/2018 |
| CN | 108527370 A | 9/2018 |

(Continued)

OTHER PUBLICATIONS

Stackoverflow, How can I timeout a thread on linux? https://stackoverflow.com/questions/21379780/how-can-i-timeout-a-thread-on-linux (Year: 2014).*

*Primary Examiner* — Jeff A Burke
*Assistant Examiner* — Arslan Azhar
(74) *Attorney, Agent, or Firm* — Perspectives Law Group, Corp.

(57) ABSTRACT

A robotic system includes a user interface configured to receive a jog command for manually operating a robotic unit; a control unit, coupled to the user interface, configured to: real-time parallel process the jog command including to: execute a collision check thread to determine whether the jog command results in a collision or results in an unobstructed status for the robotic unit within an operation environment based on an environment model and a robot model, execute a jog operation thread to determine whether the unobstructed status is provided within a collision check time limit; and execute the jog command by the robotic unit based on the unobstructed status provided before the collision check time limit.

20 Claims, 6 Drawing Sheets

(56) References Cited

U.S. PATENT DOCUMENTS

| | | | |
|---|---|---|---|
| 2006/0058921 A1* | 3/2006 | Okamoto | G05D 1/0272 |
| | | | 701/25 |
| 2008/0234864 A1 | 9/2008 | Sugiura et al. | |
| 2009/0118863 A1 | 5/2009 | Darush | |
| 2010/0152899 A1* | 6/2010 | Chang | B25J 9/1682 |
| | | | 700/262 |
| 2011/0066282 A1 | 3/2011 | Bosscher et al. | |
| 2014/0163736 A1 | 6/2014 | Azizian et al. | |
| 2015/0269450 A1 | 9/2015 | Tasaki | |
| 2016/0207195 A1 | 7/2016 | Eto et al. | |
| 2017/0239814 A1 | 8/2017 | Toyama et al. | |
| 2018/0222050 A1 | 8/2018 | Vu et al. | |
| 2018/0272535 A1 | 9/2018 | Ogawa et al. | |
| 2019/0143512 A1 | 5/2019 | Corkum et al. | |
| 2019/0262993 A1* | 8/2019 | Cole | B25J 9/1676 |
| 2020/0114515 A1* | 4/2020 | Thackston | B25J 9/1664 |
| 2021/0132607 A1* | 5/2021 | Maeng | G05D 1/0246 |

FOREIGN PATENT DOCUMENTS

| | | |
|---|---|---|
| JP | H08300277 A | 11/1996 |
| JP | H11161311 A | 6/1999 |
| JP | 2001009773 A | 1/2001 |
| JP | 2015184874 A | 10/2015 |
| JP | 2016132521 A | 7/2016 |
| JP | 2017148893 A | 8/2017 |
| JP | 2018158391 A | 10/2018 |
| JP | 2020062741 A | 4/2020 |

* cited by examiner

ROBOTIC SYSTEM WITH COLLISION AVOIDANCE MECHANISM AND METHOD OF OPERATION THEREOF

CROSS-REFERENCE TO RELATED APPLICATION

This application claims the benefit of U.S. Provisional Patent Application Ser. No. 63/010,068 filed Apr. 15, 2020, and the subject matter thereof is incorporated herein by reference thereto.

TECHNICAL FIELD

The present technology is directed generally to robotic systems and, more specifically, to collision avoidance mechanism.

BACKGROUND

Modern robotics and automation are providing increasing levels of functionality to support in industrial settings, such as manufacturing facilities, receiving and distribution centers, and warehouses. Research and development in the existing technologies can take a myriad of different directions.

As users become more empowered with the growth of robotic systems, new and old paradigms begin to take advantage of this new technology space. There are many technological solutions to take advantage of these new capabilities to enhance or augment automation of robotic systems, such as the capability for the robotic systems to avoid collisions. However, manual operations are still required with the additional functionalities of robotic systems and avoidance of collisions are still required for manual operations.

Thus, a need still remains for a robotics system with a collision avoidance mechanism for manual operations. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a robotic system, including: a user interface configured to receive a jog command for manually operating a robotic unit; a control unit, coupled to the user interface, configured to: real-time parallel process the jog command including to: execute a collision check thread to determine whether the jog command results in a collision or results in an unobstructed status for the robotic unit within an operation environment based on an environment model and a robot model, execute a jog operation thread to determine whether the unobstructed status is provided within a collision check time limit; and execute the jog command by the robotic unit based on the unobstructed status provided before the collision check time limit.

An embodiment of the present invention provides a method of operation of a robotic system including: receiving a jog command for manually operating a robotic unit; real-time parallel processing the jog command including: executing a collision check thread to determine whether the jog command results in a collision or results in an unobstructed status for the robotic unit within an operation environment based on an environment model and a robot model, executing a jog operation thread to determine whether the unobstructed status is provided within a collision check time limit; executing the jog command by the robotic unit based on the unobstructed status provided before the collision check time limit.

An embodiment of the present invention provides a non-transitory computer readable medium including instructions for a robotic system, including: receiving a jog command for manually operating a robotic unit; real-time parallel processing the jog command including: executing a collision check thread to determine whether the jog command results in a collision or results in an unobstructed status for the robotic unit within an operation environment based on an environment model and a robot model, executing a jog operation thread to determine whether the unobstructed status is provided within a collision check time limit; executing the jog command by the robotic unit based on the unobstructed status provided before the collision check time limit.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
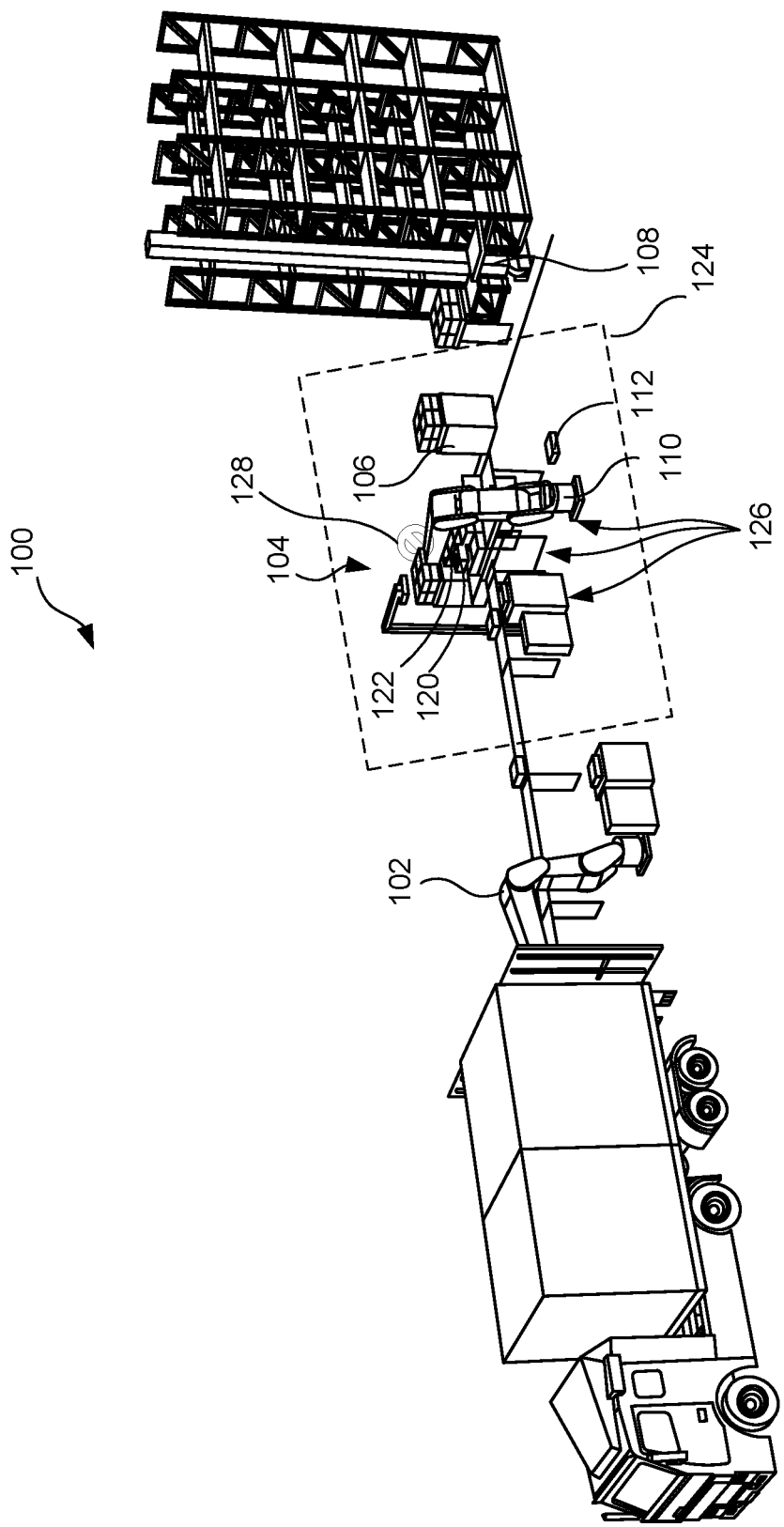
FIG. 1 is an example environment for a robotic system with a collision avoidance mechanism in an embodiment.

In the following description, numerous specific details are set forth to provide a thorough understanding of the presently disclosed technology. In other embodiments, the techniques introduced here can be practiced without these specific details. In other instances, well-known features, such as specific functions or routines, are not described in detail in order to avoid unnecessarily obscuring the present disclosure. References in this description to "an embodiment," "one embodiment," or the like mean that a particular feature, structure, material, or characteristic being described is included in at least one embodiment of the present disclosure. The appearances of such phrases in this specification do not necessarily all refer to the same embodiment. On the other hand, such references are not necessarily mutually exclusive. Furthermore, the particular features, structures, materials, or characteristics can be combined in any suitable manner in one or more embodiments.

It is to be understood that the various embodiments shown in the figures are merely illustrative representations. Further, the drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

Several details describing structures or processes that are well known and often associated with robotic systems and subsystems, but that can unnecessarily obscure some significant aspects of the disclosed techniques, are not set forth in the following description for purposes of clarity. Moreover, although the following disclosure sets forth several embodiments of different aspects of the present technology, several other embodiments can have different configurations or different components than those described in this section. Accordingly, the disclosed techniques can have other embodiments with additional elements or without several of the elements described below.

Many embodiments or aspects of the present disclosure described below can take the form of computer-executable or controller-executable instructions, including routines executed by a programmable computer or controller. Those skilled in the relevant art will appreciate that the disclosed techniques can be practiced on computer or controller systems other than those shown and described below. The techniques described herein can be embodied in a special-purpose computer or data processor that is specifically programmed, configured, or constructed to execute one or more of the computer-executable instructions described below. Accordingly, the terms "computer" and "controller" as generally used herein refer to any data processor and can include Internet appliances and handheld devices, including palm-top computers, wearable computers, cellular or mobile phones, multi-processor systems, processor-based or programmable consumer electronics, network computers, mini computers, and the like. Information handled by these computers and controllers can be presented at any suitable display medium, including a liquid crystal display (LCD). Instructions for executing computer- or controller-executable tasks can be stored in or on any suitable computer-readable medium, including hardware, firmware, or a combination of hardware and firmware. Instructions can be contained in any suitable memory device, including, for example, a flash drive, USB device, and/or other suitable medium.

The terms "coupled" and "connected," along with their derivatives, can be used herein to describe structural relationships between components. It should be understood that these terms are not intended as synonyms for each other. Rather, in particular embodiments, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements cooperate or interact with each other (e.g., as in a cause-and-effect relationship, such as for signal transmission/reception or for function calls), or both.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

The term "module" or "unit" referred to herein can include software, hardware, mechanical mechanisms, or a combination thereof in an embodiment of the present invention, in accordance with the context in which the term is used. For example, the software can be machine code, firmware, embedded code, or application software. Also, for example, the hardware can be circuitry, a processor, a special purpose computer, an integrated circuit, integrated circuit cores, a pressure sensor, an inertial sensor, a microelectromechanical system (MEMS), a passive device, or a combination thereof. Furthermore, the mechanical mechanism can include actuators, motors, arms, joints, handles, end effectors, guides, mirrors, anchoring bases, vacuum lines, vacuum generators, liquid source lines, or stoppers. Further, if a "module" or "unit" is written in the system claims section below, the "module" or "unit" is deemed to include hardware circuitry for the purposes and the scope of the system claims.

The modules or units in the following description of the embodiments can be coupled or attached to one another as described or as shown. The coupling or attachment can be direct or indirect, without or with intervening items between coupled or attached modules or units. The coupling or attachment can be by physical contact or by communication between modules or units.

It is also understood that the nouns or elements in the embodiments can be described as a singular instance. It is understood that the usage of singular is not limited to singular but the singular usage can be applicable to multiple instance for any particular noun or element in the application. The numerous instances can be the same or similar or can be different.

Referring now to FIG. 1, therein is shown an example environment for a robotic system 100 with a collision avoidance mechanism in an embodiment. The environment for the robotic system 100 can includes one or more structures, such as robots or robotic devices, configured to execute one or more tasks. Aspects of the object collision avoidance mechanism can be practiced or implemented by the various structures.

In the example illustrated in FIG. 1, the robotic system 100 can include an unloading unit 102, a transfer unit 104, a transport unit 106, a loading unit 108, a robotic unit 110, a controller 112, or a combination thereof in a warehouse, a distribution center, or a shipping hub. The robotic system 100 or a portion of the robotic system 100 can be configured to execute one or more tasks.

The tasks can be combined in sequence to perform an operation that achieves a goal, for example, such as to unload a target object 120 from a vehicle, such as a truck, trailer, a van, or train car, for storage in a warehouse or to unload the target object 120 from storage locations and load the target object 120 onto a vehicle for shipping. The tasks are functions performed or executed by the robotic system 100 for the physical transformation upon the unloading unit 102, the transfer unit 104, the transport unit 106, the loading unit 108, the robotic unit 110, or a combination thereof.

For example, the task can include moving the target object 120 from one location, such as a container, bin, cage, basket, shelf, platform, pallet, or conveyor belt, to another location. The robotic system 100 or a portion of the robotic system 100 can be configured to execute a sequence of actions, such as operating one or more components therein, to execute a task.

The target object 120 can represent one or more containers to be displaced or moved by the robotic system 100. An example of the target object 120 can include bins, boxes, crates, enclosures, packages, or a combination thereof. The target object 120 will be further described later.

In this example, an operation environment 124 for the robotic system 100 is described as the area and items 126 in the area where the robotic unit 110 operates within. The operation environment 124 includes the robotic unit 110 itself. As a specific example, the operation environment 124 can also include the controller 112, the transfer unit 104, the target object 120, or a combination thereof. The operation environment 124 can also include other of the items 126 shown or not shown in FIG. 1 that can affect the operations of the robotic unit 110. Similarly, the operation environment 124 can also include or be described as the area and the items 126 in the area where the unloading unit 102 operates within. For brevity, the robotic system 100 will be described with respect to the robotic unit 110 but can be applicable to the unloading unit 102 or other parts of the robotic system 100 that performs articulation or movement associated with the robotic system 100.

FIG. 1 illustrates examples of the possible functions and operations that can be performed by the various units of the robotic system 100 in handling the target object 120 and it is understood that the environment, including the operation environment 124, and conditions can differ from those described hereinafter. For example, the unloading unit 102 can be a vehicle offloading robot configured to transfer the target object 120 from a location in a carrier, such as a truck, to a location on a conveyor belt.

Also, the transfer unit 104, such as a palletizing robot, can be configured to transfer the target object 120 from a location on the conveyor belt to a location on the transport unit 106, such as for loading the target object 120 on a pallet on the transport unit 106. In another example, the transfer unit 104 can be a piece-picking robot configured to transfer the target object 120. In completing the operation, the transport unit 106 can transfer the target object 120 from an area associated with the transfer unit 104 to an area associated with the loading unit 108, and the loading unit 108 can transfer the target object 120, such as by moving the pallet carrying the target object 120, from the transfer unit 104 to a storage location, such as a location on the shelves.

For illustrative purposes, the robotic system 100 is described in the context of a shipping center; however, it is understood that the robotic system 100 can be configured to execute tasks in other environments or for other purposes, such as for manufacturing, assembly, packaging, healthcare, or other types of automation. It is also understood that the robotic system 100 can include other units, such as manipulators, service robots, modular robots, that are not shown in FIG. 1. For example, in some embodiments, the robotic system 100 can include a depalletizing unit for transferring the objects from cages, carts, or pallets onto conveyors or other pallets, a container-switching unit for transferring the objects from one container to another, a packaging unit for wrapping the objects, a sorting unit for grouping objects according to one or more characteristics thereof, a piece-picking unit for manipulating the objects differently, such as sorting, grouping, and/or transferring, according to one or more characteristics thereof, or a combination thereof.

The controller 112 can provide the intelligence for the robotic system 100 or a portion of the robotic system 100 to perform the tasks. As an example, the controller 112 can control the operations of the robotic unit 110 and the motions of the robotic unit 110 to perform the tasks. The controller 112 can control operations of the robotic unit 110 to perform tasks associated with the target object 120. The controller 112 can provide manual operation instructions to the robotic unit 110 as well as pre-programmed operations with a trajectory. Manual operations do not have pre-programmed trajectory for motion of at least a portion of the robotic unit 110.

The controller 112 can provide parallel processing of executing instructions to perform a task. As an example, the controller 112 can parallel process instructions for collision checking to avoid a collision 128 by the robotic unit 110 as well as simultaneously executing other instructions related to the manual operation without waiting for the for the collision checking to be completed. The collision 128 is a physical contact by the robotic unit 110 with at least one of the items 126 in the operation environment 124 that is not included as part of the instruction of the operation of the robotic unit 110. The collision 128 can also include physical contact by at least a portion of the robotic unit 110 with another portion of the robotic unit 110 that is not included as part of the instruction of the operation of the robotic unit 110.

For illustrative purposes, the robotic system 100 is described with separate components, such as the robotic unit 110 and the controller 112, although it is understood that the robotic system 100 can be organized differently. For example, the robotic system 100 can include the functions provided by the controller 112 distributed throughout the robotic system 100 and not as a separate enclosure for the controller 112 as shown in FIG. 1. Also for example, the controller 112 can be included as a portion of the robotic unit 110. Further for example, the controller 112 can be multiple enclosure each providing intelligences to different portions or units of the robotic system 100.

Returning to the robotic unit 110, the robotic unit 110 can include a gripper 122. The robotic unit 110 can utilize the gripper 122 to move the target object 120 in the transfer unit 104. As described earlier, the controller 112 can provide the intelligences for the robotic unit 110. Similarly, the controller 112 can also provide the intelligence for the gripper 122.

As an example, the intelligence from the controller 112 can be distributed with the robotic unit 110. As a specific example, the gripper 122 can also provide some intelligence for the operation of the gripper 122 and can interact with the intelligence from the controller 112 or the distributed intelligence as part of the robotic unit 110.

Figure 2:
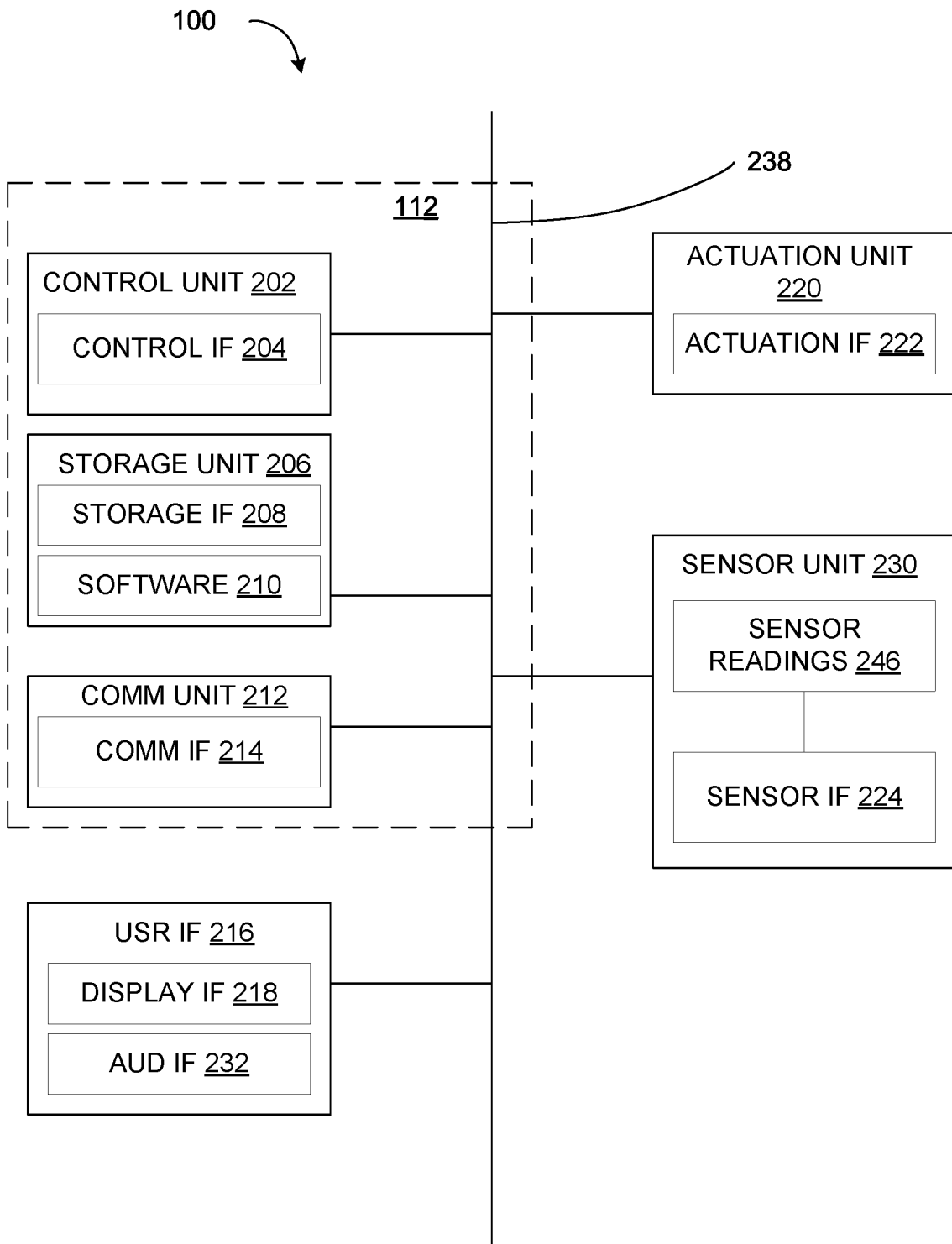
FIG. 2 is an example of a block diagram of the robotic system.

Referring now to FIG. 2, therein is shown an example of a block diagram of the robotic system 100. The example shown in FIG. 2 can be for the robotic system 100 shown in FIG. 1. In one embodiment, the robotic system 100 can include a control unit 202, a storage unit 206, a communication unit 212, a user interface 216, an actuation unit 220, and a sensor unit 230. In one embodiment, one or more of these components can be combined in the controller 112 as depicted by a dashed box.

The controller 112 can house a portion of the robotic system 100. For example, the controller 112 can be a case, a chassis, a box, a console, a computer tower, or a computer motherboard. As a specific example, the operation environment 124 of FIG. 1 can include the controller 112. Also as a specific example, the robotic unit 110 of FIG. 1 can also include the controller 112. Further as a specific example, the controller 112 can be distributed in the robotic system 100. Yet further as a specific example, there can be a plurality of the controller 112 within, external to, or a combination thereof with respect to the robotic system 100.

Continuing with the example, the control unit 202, the storage unit 206, the communication unit 212, or a combination thereof can be housed and included in the controller 112. Also for example, the control unit 202, the storage unit 206, the communication unit 212, or a combination thereof can be housed and included in the controller 112 while the user interface 216, can be accessible external to the controller 112.

While one or more portions of the robotic system 100 can be housed in or on the controller 112, other portions of the robotic system 100 can be external to the controller 112. For example, the user interface 216, the actuation unit 220, the sensor unit 230, or a combination thereof can be external to the controller 112 while the control unit 202, the storage unit 206, and the communication unit 212, are housed and included in the controller 112. Other combinations of portions of the robotic system 100 or the robotic unit 110 can be housed in the controller 112 or together.

Further, for example, the operation environment 124 can include the robotic unit 110, the controller 112, the sensor unit 230, the user interface 216, the communication unit 212, the storage unit 206, the control unit 202, or a combination thereof. As a specific example, the robotic unit 110 can include the sensor unit 230, the communication unit 212, the storage unit 206, the control unit 202, or a combination thereof.

The control unit 202 can execute a software 210 to provide the instructions and intelligence of the robotic system 100. The control unit 202 can also execute the software 210 for the other functions of the robotic system 100, the robotic unit 110, the controller 112, or a combination thereof. The control unit 202 can be implemented in a number of different ways. For example, the control unit 202 can be a processor, an application specific integrated circuit (ASIC), an embedded processor, a microprocessor, a hardware control logic, a hardware finite state machine (FSM), a digital signal processor (DSP), or a combination thereof.

For illustrative purposes, the control unit 202 is shown as a single element, although it is understood that the control unit 202 can represent a number of devices and a distribution of compute resources. For example, the control unit 202 can be a distribution of compute resources throughout and external to the robotic system 100. Also for example, the control unit 202 can be distributed between the controller 112, the robotic unit 110, the sensor unit 230, the gripper 122 of FIG. 1, or a combination thereof. The software 210 can also be distributed between the controller 112, the robotic unit 110, the sensor unit 230, the gripper 122, or a combination thereof.

The control unit 202 can perform parallel processing of instructions of the software 210 and can be implemented in a number of ways. For example, the control unit 202 can include multiple processing cores each capable of executing instructions from the software 210. Also for example, the control unit 202 can include a pipeline architecture capable of executing multiple instructions of the software 210 before completion of the previous instruction. Further, for example, the control unit 202 can execute multiple instructions of the software 210 with distributed computing in addition to processing cores and pipeline architecture.

The control unit 202 can include a control interface 204. The control interface 204 can be used for communication between the control unit 202 and other functional units of the robotic system 100, the robotic unit 110, the sensor unit 230, or a combination thereof. The control interface 204 can also be used for communication that is external to the robotic system 100. The control interface 204 can receive information from the other functional units or from external sources, or can transmit information to the other functional units or to external destinations. The external sources and the external destinations refer to sources and destinations external to the robotic system 100.

The control interface 204 can be implemented in different ways and can include different implementations depending on which functional units or external units are being interfaced with the control interface 204. For example, the control interface 204 can be implemented with a pressure sensor, an inertial sensor, a microelectromechanical system (MEMS), optical circuitry, waveguides, wireless circuitry, wireline circuitry, an application programming interface, or a combination thereof.

The storage unit 206 can store the software 210. For illustrative purposes, the storage unit 206 is shown as a single element, although it is understood that the storage unit 206 can represent a number of devices and a distribution of storage elements. Also for illustrative purposes, the robotic system 100 is shown with the storage unit 206 as a single hierarchy storage system, although it is understood that the robotic system 100 can have the storage unit 206 in a different configuration. For example, the storage unit 206 can be formed with different storage technologies forming a memory hierarchal system including different levels of caching, main memory, rotating media, or off-line storage. Also for example, the storage unit 206 can be distributed between the controller 112, the robotic unit 110, the gripper 122, or a combination thereof. The software 210 can also be distributed between the controller 112, the robotic unit 110, the gripper 122, or a combination thereof.

The storage unit 206 can be a volatile memory, a nonvolatile memory, an internal memory, an external memory, or a combination thereof. For example, the storage unit 206 can be a nonvolatile storage such as non-volatile random access memory (NVRAM), Flash memory, disk storage, or a volatile storage such as static random access memory (SRAM).

The storage unit 206 can include a storage interface 208. The storage interface 208 can be used for communication between the storage unit 206 and other functional units of the robotic system 100. The storage interface 208 can also be used for communication external to the robotic system 100. The storage interface 208 can receive information from the other functional units of the robotic system 100 or from external sources, or can transmit information to the other functional units of the robotic system 100 or to external destinations. The external sources and the external destinations refer to sources and destinations external to the robotic system 100.

The storage interface 208 can include different implementations depending on which functional units or external units are being interfaced with the storage unit 206. The storage interface 208 can be implemented with technologies and techniques similar to the implementation of the control interface 204.

The communication unit 212 can enable communication to and from the robotic system 100, including communication between portions of the robotic system 100, external devices, or a combination thereof. For example, the communication unit 212 can permit the robotic system 100 to communicate with an external device, such as an external computer, an external database, an external machine, an external peripheral device, or a combination thereof through a communication path 238.

The communication path 238 can span and represent a variety of networks and network topologies. For example, the communication path 238 can include wireless communication, wired communication, optical communication, ultrasonic communication, or the combination thereof. For example, satellite communication, cellular communication, Bluetooth, Infrared Data Association standard (IrDA), wireless fidelity (WiFi), and worldwide interoperability for microwave access (WiMAX) are examples of wireless communication that can be included in the communication path 238. Cable, Ethernet, digital subscriber line (DSL), fiber optic lines, fiber to the home (FTTH), and plain old telephone service (POTS) are examples of wired communication that can be included in the communication path 238.

Further, the communication path 238 can traverse a number of network topologies and distances. For example, the communication path 238 can include direct connection, personal area network (PAN), local area network (LAN), metropolitan area network (MAN), wide area network (WAN), or a combination thereof. Also for example, the communication path 238 can also include information exchange between elements within the robotic system 100. As a specific example, the communication path 238 can be between the parts of the robotic unit 110, with the sensor unit 230, with the controller 112, or a combination thereof. The control unit 202 can further execute the software 210 for interaction with the communication path 238 via the communication unit 212.

The communication unit 212 can also function as a communication hub allowing the robotic system 100 to function as part of the communication path 238 and not be limited to be an end point or terminal unit to the communication path 238. The communication unit 212 can include active and passive components, such as microelectronics or an antenna, for interaction with the communication path 238.

The communication unit 212 can include a communication interface 214. The communication interface 214 can be used for communication between the communication unit 212 and other functional units of the robotic system 100. The communication interface 214 can receive information from the other functional units of the robotic system 100 or from external sources, or can transmit information to the other functional units of the robotic system 100 or to external destinations. The communication interface 214 can include different implementations depending on which functional units are being interfaced with the communication unit 212. The communication interface 214 can be implemented with technologies and techniques similar to the implementation of the control interface 204.

The control unit 202 can operate the user interface 216 to present or receive information generated by the robotic system 100. The user interface 216 can include an input device and an output device. Examples of the input device of the user interface 216 can include a keypad, a touchpad, soft-keys, a keyboard, a microphone, sensors for receiving remote signals, a camera for receiving motion commands, or any combination thereof to provide data and communication inputs. Examples of the output device can include a display interface 218 and an audio interface 232.

The display interface 218 can be any graphical user interface such as a display, a projector, a video screen, or any combination thereof. The audio interface 232 can include speakers, microphones, headphones, subwoofers, sound components, transducers, or any combination thereof. The display interface 218 and the audio interface 232 allow a user of the robotic system 100 to interact with the robotic system 100. The display interface 218 and the audio interface 232 can be optional.

The robotic system 100 can also include the actuation unit 220. The actuation unit 220 can include devices, for example, motors, springs, gears, pulleys, chains, rails, wires, artificial muscles, electroactive polymers, or a combination thereof, configured to drive, manipulate, displace, orient, re-orient, or a combination thereof, the structural members or mechanical components of the robotic system 100 about or at a corresponding mechanical joint. The control unit 202 can operate the actuation unit 220, to control or manipulate the actuation unit 220.

For illustrative purposes, the actuation unit 220 is shown as a single element, although it is understood that the actuation unit 220 can represent a number of devices and be a distribution of actuators. For example, the actuation unit 220 can be distributed throughout the robotic system 100. Also for example, the actuation unit 220 can be distributed throughout the robotic unit 110, the gripper 122, or a combination thereof.

The actuation unit 220 can include an actuation interface 222. The actuation interface 222 can be used for communication between the actuation unit 220 and other functional units of the robotic system 100, the robotic unit 110, the gripper 122, or a combination thereof. The actuation interface 222 can also be used for communication that is external to the robotic system 100. The actuation interface 222 can receive information from the other functional units of the robotic system 100 or from external sources, or can transmit information to the other functional units or to external destinations. The actuation interface 222 can function as a source for the actuation process, such as gas lines.

The actuation interface 222 can include different implementations depending on which functional units of the robotic system 100 or external units are being interfaced with the actuation unit 220. The actuation interface 222 can be implemented with technologies and techniques similar to the implementation of the control interface 204. The actuation interface 222 can also be implemented with pneumatic or gas devices.

The robotic system 100 can include the sensor unit 230 configured to obtain sensor readings 246 used to execute the tasks and operations, such as for manipulating the structural members of the robotic system 100, the robotic unit 110, the gripper 122, or a combination thereof. The sensor unit 230 can also be configured to obtain the sensor readings 246 for portions of the robotic system 100. For example, the sensor unit 230 can obtain the sensor readings 246 for the robotic unit 110, the gripper 122, or a combination thereof. Also for example, the sensor unit 230 can obtain the sensor readings 246 for the items 126 of FIG. 1 operated upon by the robotic system 100, the robotic unit 110, the gripper 122, or a combination thereof. As a specific example, the sensor unit 230 can provide the sensor readings 246 for the target object 120 of FIG. 1.

The sensor readings 246 can include information or data from the sensor unit 230 to detect events or changes in the environment of the robotic system 100 and to send the information to portions of the robotic system 100, external devices, or a combination thereof to facilitate the tasks. Examples for the sensor readings 246 can include image readings, optical readings, pressure reading, distance reading, or a combination thereof. Also as examples, the sensor readings 246 can represent the distance from an object that can cause collision or impact to the robotic unit 110 or a portion of the robotic unit 110.

For illustrative purposes, the sensor unit 230 is shown as a single element, although it is understood that the sensor unit 230 can represent a number of devices. For example, the actuation unit 220 can be distributed throughout the robotic system 100. Also for example, the actuation unit 220 can be distributed throughout the robotic unit 110, the gripper 122, or a combination thereof.

The sensor unit 230 can include a sensor interface 224. The sensor interface 224 can be used for communication between the sensor unit 230 and other portions of the robotic system 100, the robotic unit 110, or a combination thereof. The sensor interface 224 can also be used for communication that is external to the robotic system 100, the robotic unit 110, or a combination thereof. The sensor interface 224 can receive information from the other portions of the robotic system 100 or from external sources, or can transmit information to the other portions of the robotic system 100 or to external destinations. As a specific example, the sensor interface 224 can provide communication with and between the robotic unit 110, the gripper 122, or a combination thereof as well as with the other portions of the robotic system 100.

The sensor interface 224 can include different implementations depending on which functional units of the robotic system 100 or external units are being interfaced with the sensor unit 230. The sensor interface 224 can be implemented with technologies and techniques similar to the implementation of the control interface 204.

Figure 3:
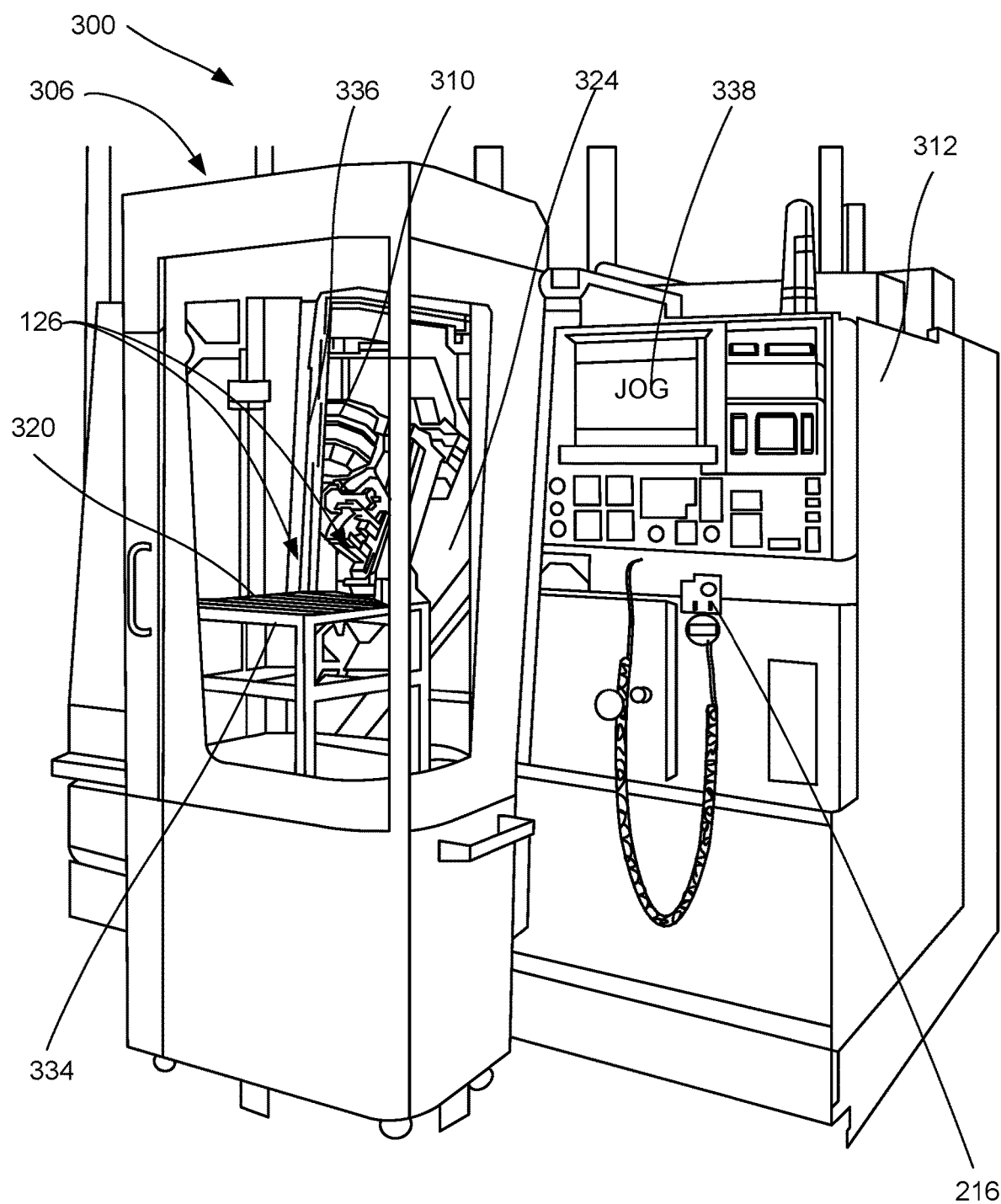
FIG. 3 is another example of a robotic system in a further embodiment.

Referring now to FIG. 3, therein is shown another example of a robotic system 300 in a further embodiment. The robotic system 300 can includes one or more structures, such as robots or robotic devices, configured to execute one or more tasks. Aspects of the object collision avoidance mechanism can be practiced or implemented by the various structures. The similarities to the robotic system 100 are not all repeated for the robotic system 300. Additional information or distinctions from the robotic system 100 can be described in FIG. 3. The block diagram in FIG. 2 is also applicable to the robotic system 300 and not repeated for brevity.

In the example and embodiment in FIG. 3, the robotic system 300 can include a transport unit 306, a robotic unit 310, a controller 312, or a combination thereof. The robotic system 300 or a portion of the robotic system 300 can be configured to execute one or more tasks.

For the embodiment shown in FIG. 3 and as an example, the transport unit 306 can transfer the target object 320 for the task of processing by the robotic unit 310. The transport unit 306 can include shelves 334 or bins loaded with the target object 320 and rolled to the place to be accessed by the robotic unit 310. The transport unit 306 can also include a door 336 between the transport unit 306 and a portion of an operation environment 324 for the robotic unit 310 to operate.

The door 336 can provide separation of the interior of the transport unit 306 and the portion of the operation environment 324 where the robotic unit 310 is located, in this example. The door 336 can be in an open position or a closed position. The open position allows the robotic unit 310 access into the interior of the transport unit 306. The closed position prevents the robotic unit 310 access to the interior of the transport unit 306.

Continuing the example of FIG. 3, the robotic unit 310 can operate on the target object 320. As a specific example, the robotic unit 310 can grab the target object 320 from the transport unit 306. The robotic unit 310 can secure and move the target object 320 for and during processing by the robotic system 300. The user interface 216 can invoke the tasks to secure, move, process, or a combination thereof the target object 320 by the robotic unit 310, the robotic system 300, or a combination. The user interface 216 can provide manual commands to the robotic system 300, the robotic unit 310, or a combination thereof. The user interface 216 can be part of or operates with the controller 312.

For example, the manual commands can include a jog command 338. The jog command 338 instructs at least a portion of the robotic unit 310 to move by manual operation. As an example, the jog command 338 does not include a pre-planned trajectory of motion but instead includes commands to direct the robotic unit 310 by the manual operation.

Similar to the controller 112 of FIG. 1, the controller 312 can provide the instruction, intelligence, or operational control for the task for the robotic system 300, the robotic unit 310, or a combination thereof. The controller 312 can also provide the collision avoidance with the operation environment 324 of the robotic unit 310 within the robotic system 300, the transport unit 306, or a combination thereof. The tasks are functions performed or executed by the robotic system 300 to effectuate the physical transformation with the transport unit 306, the robotic unit 310, the target object 320, or a combination thereof.

The operation environment 324 for the robotic system 300 is similar as described for the robotic system 100. In this example, the operation environment 324 for the robotic system 300 is described including the physical space and the items 126 in the physical space in which the robotic unit 310 operates. The operation environment 324 includes the robotic unit 310 itself.

Continuing this example, the operation environment 324 can provide information about the robotic system 300, the robotic unit 310, or a combination thereof. Returning to the example of the transport unit 306, the operation environment 324 can include a chamber where the robotic unit 310 is housed within. The operation environment 324 represent the physical environment, the information for the physical environment, or a combination thereof. The operation environment 324 when representing the physical environment can also include information about the door 336, such as location, whether in the open position, the closed position, the location and information of the shelves 334, the location and information of the target object 320, or a combination thereof.

Further continuing this example, the operation environment 324 can also other types of the items 126 including tooling as well as one or more mechanisms within the chamber for executing the task for the processing the target object 320. The operation environment 324 can also include a further instance of the robotic unit 310 or other robotic devices capable of movement similar to, that is the same as, or different to the robotic unit 310. The other tooling, mechanism(s), structures, or a combination thereof can be stationary and at a fixed position or capable of being moved for processing the target object 320. The operation environment 324 can also include other instances of the items 126 shown or not shown in FIG. 3 that can affect the operations of the robotic unit 310.

FIG. 3 illustrates examples of the possible functions and operations that can be performed by the various units of the robotic system 300 in handling the target object 320 and it is understood that the environment, including the operation environment 324, and conditions associated with the environment can differ from those described. For example, the unloading unit 102 of FIG. 2 can be a vehicle offloading robot configured to transfer the target object 320 from a location in a carrier, such as a truck, to a location on a conveyor belt. Also as an example, the transfer unit 104 of FIG. 1 can be configured to transfer the target object 320 to the transport unit 306.

For illustrative purposes, the robotic system 300 is described in the context processing the target object 320 and can be an extension of or be included in the robotic system 100 as described in FIG. 1, although, it is understood that the robotic system 300 can be configured to operate separately from the operational example described in FIG. 1. The robotic system 300 can execute tasks in other environments or for other purposes, such as for manufacturing, assembly, packaging, healthcare, or other types of automation. It is also understood that the robotic system 300 can include other units, such as manipulators, service robots, modular robots, that are not shown in FIG. 3.

Also for illustrative purposes, the robotic system 300 is described with separate components, such as the robotic unit 310 and the controller 312, although it is understood that the robotic system 300 can be organized differently. For example, the robotic system 300 can include the functions provided by the controller 312 distributed throughout the robotic system 300 and not as a separate enclosure from the transport unit 306, the robotic unit 310, or a combination thereof as shown in FIG. 3. Also for example, the controller 312 can be included as a portion of the transport unit 306, the robotic unit 310, or a combination thereof. Further for example, the controller 312 can be multiple enclosure each providing intelligence to different portions or units of the robotic system 300.

Figure 4:
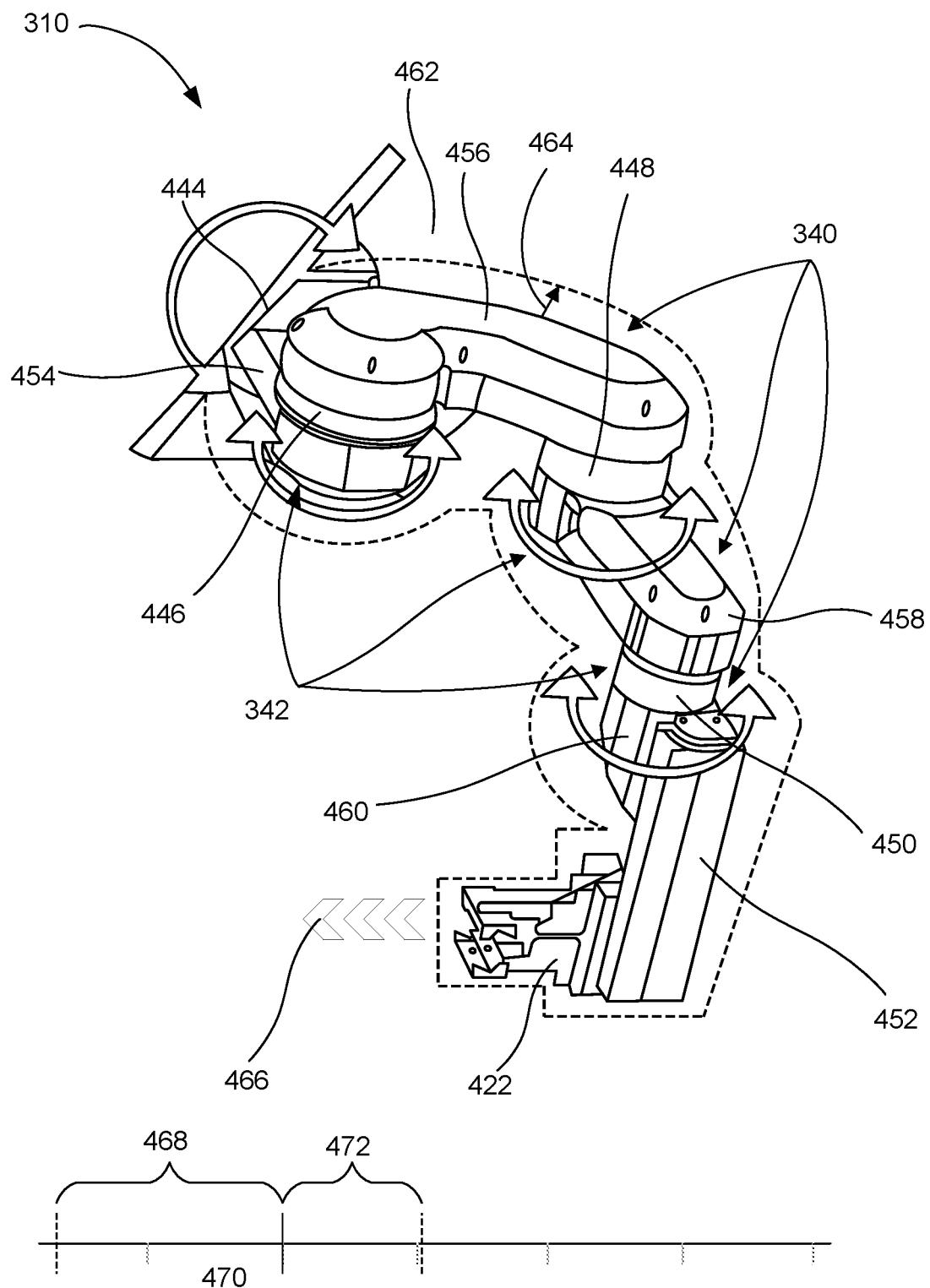
FIG. 4 is an example of the robot unit.

Referring now to FIG. 4, therein is an example of the robotic unit 310. Description for the robotic unit 310 can also be applicable to the robotic unit 110 of FIG. 1 as well as other robotic devices in FIG. 1, such as the loading unit 108 of FIG. 1.

In this example, the robotic unit 310 includes links 340 and joints 342. The joints 342 provide the articulation or actuating portion of the robotic unit 310. The joints 342 are typically between the links 340. Collectively, the joints 342 can provide the articulation or the actuation of the robotic unit 310 as a whole with the links 340 providing the rigid members of the robotic unit 310. As an example, movement of the joints 342 can be implemented by one or more of the actuation unit 220 of FIG. 2 of the same or different types.

Some of the joints 342 can provide rotational articulation or, more specifically, rotational actuation of the links 340 attached to each of the joints 342. Other instances of the joints 342 can provide translational or linear articulation or actuation, such as the instance of the joints 342 attached to or articulating a gripper 422. The gripper 422 can be similarly described as the gripper 122 of FIG. 1.

Continuing this example, the robotic unit 310 is shown at one end attached to the interior of the operation environment 324 representing the interior chamber of the robotic system 300 where the robotic unit 310 operates. In this example, the joints 342 can include a first joint 444, a second joint 446, a third joint 448, a fourth joint 450, a fifth joint 452, or a combination thereof. Also for example, the links 340 can include a first link 454, a second link 456, a third link 458, a fourth link 460, or a combination thereof.

As a specific example, the first joint 444 is shown connecting the interior of the chamber to the first link 454. The first joint 444 is shown in FIG. 4 as providing rotational actuation and acts upon the first link 454. The second joint 446 is shown as providing rotational actuation and acts upon the second link 456 from the first link 454. The third joint 448 is shown as providing rotation actuation and acts upon the third link 458 from the second link 456. The fourth joint 450 is shown as providing rotation actuation and acts upon the fourth link 460 from the third link 458. The fifth joint 452 is shown as providing linear actuation and acts open the gripper 422 from the fourth link 460.

As examples, the shelves 334 of FIG. 3, the target object 320 of FIG. 3, and the robotic unit 310 can each be modeled with a buffer zone 462. The robotic system 300, the controller 312 of FIG. 3, or a combination thereof operates the robotic unit 310 and can utilize the buffer zone 462 to avoid the collision 128 of FIG. 1 or unintended contact within the operation environment 324, the transport unit 306 of FIG. 3, or with the door 336 of FIG. 3.

The buffer zone 462 provides a threshold distance 464 around the robotic unit 310 to determine whether a collision can occur resulting from a movement. The threshold distance 464 is defined by a speed 466, a cycle number 468, and a cycle time 470. The speed 466 is the rate of motion by at least a portion of the robotic unit 310 based on the jog command 338. The cycle number 468 is the number of control intervals 472. The cycle time 470 is the amount of time or duration for each of the control intervals 472. The control intervals 472 will be described later.

As an example, the buffer zone 462 can surround the model representing the entire physical outline of the robotic unit 310 and the dimensionality of coverage for the buffer zone 462 can vary. For example, the buffer zone 462 can include three dimensional coverage surrounding the physical outline of the robotic unit 310. Also for example, the buffer zone 462 can also provide a partial outline of the robotic unit 310 and can be two dimensional. The two dimensional version of the buffer zone 462 can be planar to the plane of movement. The two dimensional version of the buffer zone 462 can also be nonplanar to coincide with a nonlinear path of movement. The buffer zone 462 can also be limited, as needed, to a side of the robotic unit 310 where the side is to the direction of the movement. Further for example, the buffer zone 462 can also be one dimensional from the further extent along a side of the robotic unit 310 where the side is to the direction of the movement.

The size or extent of the buffer zone 462 as determined by the threshold distance 464 beyond the physical outline of the robotic unit 310, the links 340, the joints 342, or a combination thereof can be fixed, can be dynamically adjusted, or can be interchangeable between fixed or adjusted. For example, the size of the buffer zone 462 can be fixed and based on the complexity of the operation environment 324 surrounding the robotic unit 310, the links 340, the joints 342, or a combination thereof. Also for example, the threshold distance 464 of the buffer zone 462 can also be fixed or based on the speed 466 of movement of the robotic unit 310, the links 340, the joints 342, or a combination thereof. The threshold distance 464 can be adjusted based on changes to the operation environment 324, collision events, or a combination thereof.

As specific examples, the buffer zone 462 can include segments to avoid the unintended contact for each of the joints 342, each of the links 340, the gripper 422, or a combination thereof. As an example, the segments of the buffer zone 462 can correspond to the joints 342, the links 340, the gripper 422, or a combination thereof and can include a first buffer, a second buffer, a third buffer, a fourth buffer, a fifth buffer, or a combination thereof. For brevity, the description for the one dimensional, two dimensional, and three dimensional outlines as described for the buffer zone 462 can also apply to the individual buffers from the first buffer through the fifth buffer. The dimensionality and the threshold distance 464 of the buffer zone 462 can be the same or different between the first buffer through the fifth buffer.

Continuing the example, the first buffer can represent the collision avoidance threshold or potential collision detection threshold for the first joint 444 and the first link 454. The second buffer can represent the collision avoidance threshold or potential collision detection threshold for the second joint 446 and the second link 456. The third buffer can represent the collision avoidance threshold or potential collision detection threshold for the third joint 448 and the third link 458. The fourth buffer can represent the collision avoidance threshold or potential collision detection threshold for the fourth joint 450 and the fourth link 460. The fifth buffer can represent the collision avoidance threshold or the potential collision detection threshold for the fifth joint 452 and the gripper 422.

As an example, the robotic unit 310 can include the sensor unit 230 to provide the sensor readings 246 of FIG. 2 for the buffer zone 462 around the joints 342, the links 340, or a combination thereof. In this example, the sensor readings 246 can provide indications if the distance threshold or boundary outlined by the threshold distance 464 for the buffer zone 462 has been or can be triggered.

Also for example, the robotic unit 310 can include a single instance or the sensor unit 230. As a specific example, the sensor unit 230 can be at the further extent of the robotic unit 310 away from the portion attached to the wall of the chamber in the operation environment 324. Continue the specific example, the sensor unit 230 can be attached or located at the fifth joint 452 or the gripper 422.

Further for example, the sensor unit 230 can include a first sensor, a second sensor, a third sensor, a fourth sensor, a fifth sensor, or combination thereof. The first sensor can provide the first buffer. The first sensor can monitor the first buffer and be located at the first link 454 at the opposite end where the first joint 444 is located or at the first joint 444. The second sensor can provide the second buffer. The second sensor can monitor the second buffer and be located at the second link 456 at the opposite end where the second joint 446 is located or at the second joint 446. The third sensor can provide the third buffer. The third sensor can monitor the third buffer and be located at the third link 458 at the opposite end where the third joint 448 is located or at the third joint 448. The fourth sensor can provide the fourth buffer. The fourth sensor can monitor the fourth buffer and be located at the fourth link 460 at the opposite end where the fourth joint 450 is located or at the fourth joint 450. The fifth sensor can provide the fifth buffer. The fifth sensor can monitor the fifth buffer and be located at the gripper 422 or at the gripper 422.

The complexity of the operation environment 324 can determine the number of instances of the sensor unit 230 and the number of the sensor readings 246 for the robotic unit 310, the robotic system 300, or a combination thereof. The complexity of the operation environment 324 can also determine the type or types of the sensor unit 230 and the type of information from each the sensor readings 494 utilized or provided to the robotic unit 310, the robotic system 300, or a combination thereof.

For example, the operation environment 324 described as non-complex refers to very little obstructions near the robotic unit 310, the items 126 surrounding the robotic unit 310 is static or stationary, the items 126 surrounding the robotic unit 310 do not move, or a combination thereof. The operation environment 324 can also be not complex if the examples noted earlier regarding the buffer zone 462 applies to the range of motion or paths of motion for the robotic unit 310. The operation environment 324 can be more complex, as opposed to non-complex, if any of the examples noted earlier or if obstruction changes occur in the path of the range of motion for the robotic unit 310.

Further, examples of a non-complex type of the operation environment 324 include a static environment where there are no other moving objects, with few obstacles or the items 126, or a combination thereof such that the area around the robotic unit 310 can be operated for a threshold number of cycles without possibility of collision. The threshold number of cycles can refer to the operation of the robotic unit 310 to execute the jog command 338 of FIG. 3 for a pre-defined period of time before the robotic unit 310 would be determined to collide with another object or item in the operation environment 324. The least complex of the operation environment 324 would be an empty room where there are no objects or the items 126 for potential collision within the range of motion for the robotic unit 310.

If the operation environment 324 is non-complex or is considered simple, then the controller 312, the robotic system 300, or a combination thereof can utilize less number or complexity of the sensor readings 246 to avoid the collision 128 for the robotic unit 310. As an example, the robotic system 100 can utilize one instance of the sensor unit 230 and the sensor readings 246 can represent the buffer zone 462 that can be one dimensional for the distance threshold at a side of the links 340 facing the direction of movement. The selection for this example simplifies the calculation for the controller 312, the robotic system 300, or a combination thereof and can also reduce power consumption for the controller 312, the robotic unit 310, the sensor unit 230, the robotic system 300, or a combination thereof. The simplification also allows for a faster determination to avoid the collision 128 thereby improving the operation of the robotic system 300, the robotic unit 310, or a combination thereof.

Examples of a complex environment can be described as environments where the range of motion of the robotic unit 310 is limited by static obstacles, dynamic obstacles, or a combination thereof. For example, if the operation environment is complex or not simple or more towards complex along a complexity spectrum, then the controller 312, the robotic system 300, or a combination thereof can utilize more number or complexity of the sensor unit 230 to avoid the collision 128 for the robotic unit 310. As an example, the robotic system 100 can utilize multiple instances of the sensor unit 230 and the sensor readings 246 can represent the buffer zone 462. The buffer zone 462 can be partitioned to smaller segments, such as from the first buffer through the fifth buffer. The dimensionality can vary of each segment of the buffer zone 462.

Continuing with the example, some of the segment of the buffer zone 462 can be one dimensional for the threshold distance 464, while other segments can be two dimensional, while yet other segments can be three dimensional. The dimensionality for each of the sensor unit 230, for each of the segment of the buffer zone 462, for each of the links 340, for each of the joints 342, or a combination thereof can be determined by the complexity of the operation environment 324 relative to the potential path of motion for the different parts of the robotic unit 310. In other words, the complexity level of the operation environment 324 can differ relative to different portions of the robotic unit 310. The range of motion or potential path of motion for some of the links 340 can operate at a portion of the operation environment 324 that can be determined to be simple while other instances of the links 340 can operate at different portion of the operation environment 324 that are determined to be of a different level of complexities which can require different types of the sensor readings 246, the sensor unit 230, or a combination thereof to avoid the collision 128.

The variation of the sensor unit 230, the sensor readings 246, the buffer zone 462, or a combination thereof along the different instances of the links 340 of the robotic unit 310 provides the robotic system 300 the ability to simplify the calculations, as noted earlier, along with the attendant benefits but also provides the flexibility to handle different or varying complexities in the operation environment 324 as needed to balance the accuracy for collision avoidance. The ability to mix and match and account for different levels of complexity in the operation environment 324 allows the robotic system 300 to improve efficiency while increasing functional accuracy to avoid the collision 128.

Figure 5:
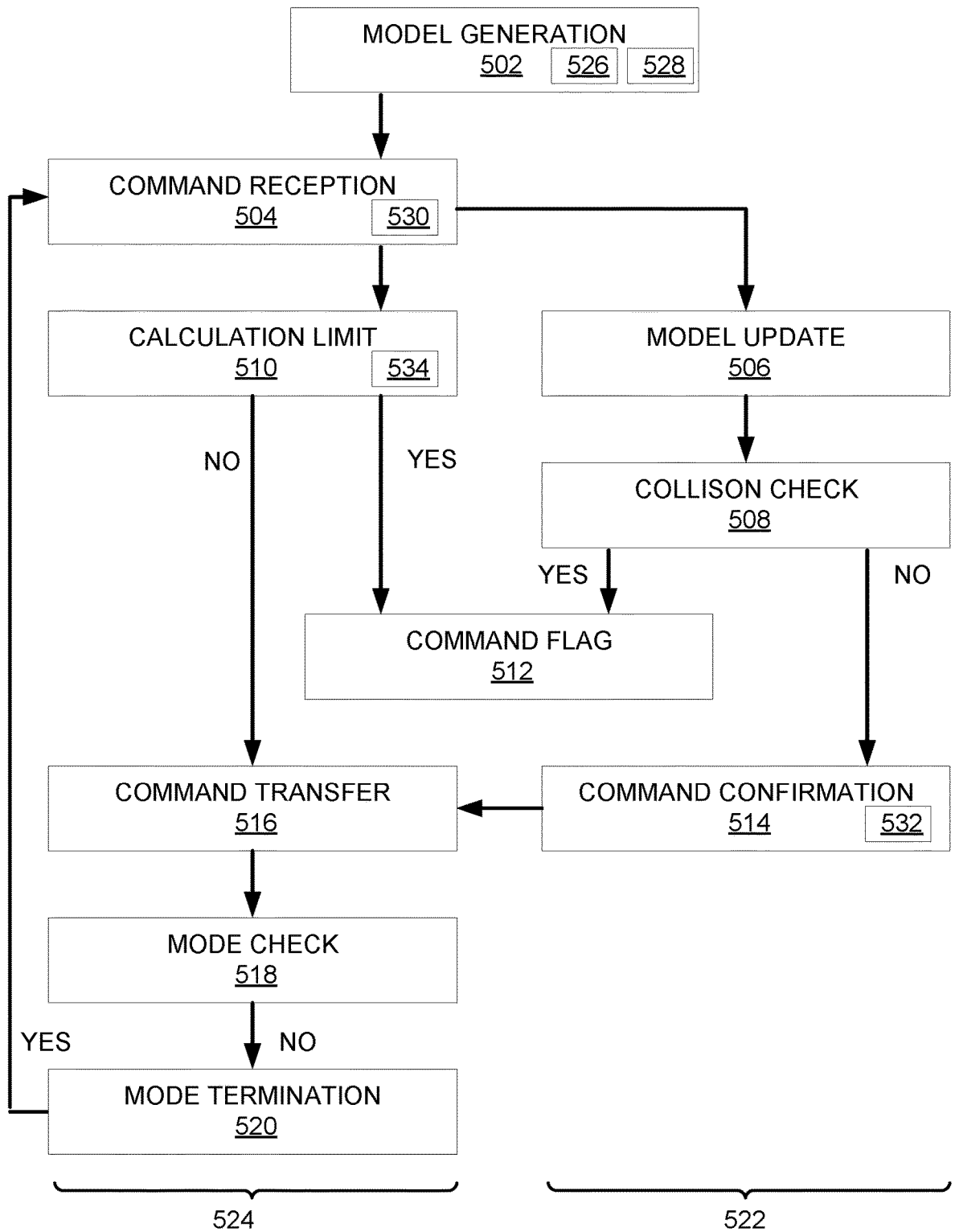
FIG. 5 is an example of a control flow for the robotic system of FIG. 3.

Referring now to FIG. 5, therein is shown an example of a control flow for the robotic system 300 of FIG. 3. The description can also apply to the robotic system 100 described in FIG. 1. The control flow can include a model generation module 502, a command reception module 504, a model update module 506, a collision check module 508, a calculation limit module 510, a command flag module 512, a command confirmation module 514, a command transfer module 516, a mode check module 518, a mode termination module 520, or a combination thereof.

For brevity, the portion of the control flow is described as a collision check thread 522 can include the model update module 506, the collision check module 508, the command confirmation module 514, or a combination thereof. The portion of the control flow is described as a jog operation thread 524 can include the command reception module 504, the calculation limit module 510, the command transfer module 516, the mode check module 518, the mode termination module 520, or a combination thereof.

The control flow can be implemented by the software 210 of FIG. 2 and executed by the control unit 202 of FIG. 2, the controller 312 of FIG. 3, or a combination thereof. Commands can be generated by the control unit 202, the controller 312, the robotic unit 310 of FIG. 3, the robotic system 300 of FIG. 3, or a combination thereof. The commands can be initiated with the user interface 216.

The software 210 can be stored in the storage unit 206 of FIG. 2 and can be executed by the control unit 202. The control flow can include transmitting commands or to invoke actions utilizing the communication unit 212 of FIG. 2, the communication interface 214 of FIG. 2, the control interface 204 of FIG. 2, the storage interface 208 of FIG. 2, the actuation interface 222 of FIG. 2, the sensor interface 224 of FIG. 2, or a combination thereof as needed. The control flow can be executed by the gripper 422 of FIG. 4, the robotic unit 310, the controller 312, the robotic system 300, or a combination thereof.

The model generation module 502, the command reception module 504, the model update module 506, the collision check module 508, the calculation limit module 510, the command flag module 512, the command confirmation module 514, the command transfer module 516, the mode check module 518, and the mode termination module 520 can be coupled to one another using wired or wireless connections, by including an output of one module as an input of the other, by including operations of one module influence operation of the other module, or a combination thereof. The portions of the control flow can be directly coupled without intervening structures or objects other than the connector there-between, or indirectly coupled to one another.

The model generation module 502 provides an environment model 526 for the operation environment 324 of FIG. 3 as information about the surrounding environment for the robotic unit 310. The model generation module 502 can also generate a robot model 528 for the robotic unit 310. The environment model 526 can also include the robot model 528.

The environment model 526 can include information about and to represent number of the items 126 of FIG. 1, types of the items 126, location of the items 126, dimension of the items 126, mobility of the items 126, status or state of the items 126. Examples of the items 126 can include the target object 320, other robotic devices such as the unloading unit 102 of FIG. 1 or the transfer unit 104 of FIG. 1, the loading unit 108 of FIG. 1, the door 336 of FIG. 3, the shelves 334 of FIG. 3, other instances of the robotic unit 310, or a combination thereof.

As a specific example, the environment model 526 can be implemented a coordinate system that includes a representation of the robotic unit 310, the position and dimensions of objects, such walls, the door 336, the shelves 334, containers, around the robotic unit 310. The robotic system 300, the controller 312, or a combination thereof can receive information about the items 126 in the operation environment 324 and those objects can be included in the environment model 526.

The robot model 528 can represent the links 340 of FIG. 4, the joints 342 of FIG. 4, the sensor unit 230 of FIG. 2, or a combination thereof. The robot model 528 can include physical dimensions for each of the links 340, each of the joints 342, the physical relationship of the links 340 and the joints 342 to the robotic unit 310, or a combination thereof. The robot model 528 can include range of motion or motion capability for each of the links 340, each of the joints 342, or a combination thereof. The robot model 528 can also include the buffer zone 462 of FIG. 4 as well as a segmented form as the first buffer of FIG. 4, the second buffer of FIG. 4, the third buffer of FIG. 4, the fourth buffer of FIG. 4, the fifth buffer of FIG. 4, or a combination thereof.

The robot model 528 can be a mesh corresponding to the buffer zone 462 with a size that is larger than the actual physical measurements/dimensions of the robotic unit 310 to provide a buffer region around the robotic unit 310. As an example, the model generation module 502 can size the buffer zone 462, the threshold distance 464 of FIG. 3, or a combination thereof of the robot model 528 to an amount of time or number of the control intervals 472 to travel from the edge of the buffer zone 462 to the actual contact to the robotic unit 310 based on the speed 466 of FIG. 4 of the jog command 338 of FIG. 3.

As a specific example for higher movement value for the speed 466, the threshold distance 464 of the buffer zone 462 can be greater than for lower movement value for the speed 466 of the robotic unit 310. In some embodiments, the threshold distance 464 of the buffer zone 462 can be limited to a maximum or minimum if the buffer zone 462 is too big, the robotic unit 310 cannot maneuver or operate in certain spaces, even though, in reality, the robotic unit 310 can be safely jogged through the operation environment 324.

As an example, the size or the threshold distance 464 of FIG. 3 of the buffer zone 462 can be calculated based a product of the speed 466 of motion of the robotic unit 310 and number of the control intervals 472 and the unit time for each of the control intervals 472, such as 2 milliseconds (ms)

or 4 ms, that are considered to be collision free. The control intervals 472 will be described later.

The model generation module 502 can also provide the recognition of the sensor unit 230 used relative to the robotic unit 310 to determine the buffer zone 462. For example, the model generation module 502 can determine the number of instances of the sensor unit 230 is utilized with the robotic unit 310, the location of the sensor unit 230, the specification or functionality of each of the sensor unit 230 to the dimensionality of the buffer zone 462 monitored for that particular instance of the sensor unit 230, or a combination thereof. The flow can progress to the command reception module 504.

The command reception module 504 receives an instruction for a task for the robotic unit 310. The command reception module 504 can be an input from the user interface 216 of FIG. 3. As an example, the command reception module 504 can receive a command for a task when operating the robotic unit 310, the robotic system 300, or a combination thereof in manual operation.

An example of a command for manual operation is a jog command 338, which is a command for a task to move the robotic unit 310, the gripper 422, another portion of the robotic unit 310, or a combination thereof. The jog command 338 does not have a pre-planned trajectory but is controlled by the input received for manual operation. As an example, the jog command 338 can actuate the robotic unit 310 as a whole, specific instances of the links 340 and the joints 342, only single and selected instance of the links 340 and the joints 342 to perform the task, or a combination thereof. Also for example, the jog command 338 can provide a single motion or can represent more than a single motion for at least a portion of the jog command 338.

As a specific example, the robotic system 300, the robotic unit 310, or a combination thereof can be in a jogging mode for the manual operation. In the jogging mode, the instructions sent to the robotic system 300, the robotic unit 310, or a combination thereof can include or be limited to direction and the speed 466. The jog command 338 or instructions differs from a trajectory in that there is no predefined start or endpoint or the speed 466. With a trajectory, the robotic system 300, the controller 312, the robotic unit 310, or a combination thereof is provided with the start and end point for the robotic unit 310 or the portion of the robotic unit 310 being actuated and can plan the trajectory ahead of time.

For example, in jogging mode, when the user activates the jog function or initiates the jogging mode with the user interface 216, the robotic system 300, the controller 312, or a combination thereof, the activation will begin jogging or moving the at least a portion of the robotic unit 310 in the direction and the speed 466 entered or set by the user and will stop when the user ceases the jog command 338 or sends an end command 530. The end command 530 is an instruction for at least a portion of the robotic unit 310 to stop motion. As an example, the end command 530 can occur when a button or dial used by an operator to maintain the jogging mode is released. The robotic unit 310 receives and executes in real-time the jog command 338, the robotic system 300, the controller 312, or a combination thereof cannot plan the trajectory for the motion in advance.

The flow can progress for real-time parallel processing of the collision check thread 522 and the jog operation thread 524 to the model update module 506 and the calculation limit module 510, respectively. The parallel processing refers to both paths of the control flow are being executed concurrently or simultaneously. The parallel processing refers to both paths of the control flow are not required to work sequentially. Real-time refers to the processing of an instruction for manual operation of the robotic unit 310 before completion of that instance of the instruction or a manual invocation for a termination of that instruction. As a specific example, the real-time parallel processing for the jog command 338 refers to the parallel processing of that instance of the jog command 338 through the collision check thread 522 and the jog operation thread 524 beginning at the invocation of that instance of the jog command 338 and before the completion of the same instance of the jog command 338 or the invocation of the end command 530 for the same instance of the jog command 338.

The model update module 506 can update the environment model 526 based on past invocations of the jog command 338 and if additional information was gathered such that the environment model 526 needs to be updated or modified. For example, the environment model 526 can be updated when new external sensor information based on the sensor readings 246 from the sensor unit 230 is received indicating there is a change in the operation environment 324, which can include a collision. The environment model 526 can also be updated according to predetermined intervals. The predetermined intervals can be set or determine in a number of ways. For example, the predetermined intervals can be based on default sampling frequency of different sensors for the sensor unit 230. Also for example, the predetermined intervals can be specified since updating the environment model 526 can be resource intensive for the robotic system 300. Further for example, the predetermined intervals can also be based on complexity of the operation environment 324 and can be highly dynamic for updating the environment model 526 more frequently. Further for example, the predetermined intervals can be on the order of seconds since manual operation would not be able to react that quickly compared to millisecond time frame. The flow can progress to the collision check module 508.

Further, the model update module 506 can update the environment model 526 with information received from the external systems relative to the robotic unit 310, the robotic system 300, or a combination thereof. The information be associated with movable type of the items 126 in the operation environment 324. As an example, the information for the operation environment 324 can be represented in the environment model 526 is binary information. As a specific example, the information received from sensors location at the door 336 or for the door 336 to indicate whether the door 336 is open or closed. In this example, the information can be binary as simply "open" or "closed" and position as well as the location of the door 336 in "open" position and "closed" position based on information received from external sensors. As an example, the environment model 526 provides an approximation of the operation environment 324 and is not required to be an exact or precise representation. Example of information from the external system can include information from external sensors, such as perimeter sensors, actuator readings or joint values to indicate position or pose of other movable type of the items 126 or other robots in the operation environment 324, three dimensional camera, encoder that monitor the angle/position/speed of joints/servos.

As an example, notifications from the external systems does not need to be received in real-time and can be delayed slightly, such as in the order of one or two instances of the control intervals 472. In other words, updates to every aspect of the environment model 526 need not occur in every instance of the control intervals 472. The external systems that provide environment information can lag or have periods that are greater than one of the control intervals 472, so even if there is a change in the operation environment 324. The external system can take time to report the change to the controller 312 providing the function as the jogging controller. Also for example, an opening or closing of the door 336 is provided as binary information, so even if the door 336 is in the process of closing, the external reporting system can still report the door 336 as closed, even if the door 336 is still partially open or can take one or more instances of the control intervals 472 to register and report that the door 336 is actually closed. The robotic system 300 can provide an application programming interface (API) that can interface with the external systems to work with various types of sensors.

The collision check module 508 performs real-time determination of potential collision. For example, to avoid a collision, the robotic system 300, the controller 312, or a combination thereof can determine whether the invocation of the jog command 338 can result in a collision.

As an example, during jogging mode of the robotic unit 310, the robotic system 300 can include a real-time collision checking mechanism that provides a method for preventing or mitigating errors, and particularly errors that lead to collisions between the robotic unit 310 and the items 126 in the environment model 526. As a specific example, during manual jogging operation, the operator or user can make a mistake in controlling the robotic unit 310, such mispressing the controls on the user interface 216 for the jog command 338 for the robotic unit 310 to go forward when intending to command the robotic unit 310 to move in reverse.

The collision check module 508 can determine the potential collision in a number of ways. For example, the robotic system 300, the controller 312, or a combination thereof can utilize the robot model 528, the sensor readings 246, or a combination thereof to determine if a proximity of any of the items 126 in the environment model 526 passes or crosses the buffer zone 462. The collision check module 508 can also determine if the jog command 338 directs the movement of the robotic unit 310 along a path where the collision 128 of FIG. 1 occurred, a continued traversal of the buffer zone 462 of the robot model 528, or a combination thereof will lead to the collision 128. If so, there is a potential for the collision 128 and the flow can pass to the command flag module 512.

Also for example, the robot model 528 can include the granularity or the number for the sensor readings 246 to represent the number of, the types, the location, or a combination thereof of the sensor unit 230 based on the complexity of the operation environment 324 as captured in the environment model 526 as discussed in earlier. As specific examples, the robot model 528 can include the sensor readings 246 to represent the dimensionality for the number of segments, such as the first buffer through the fifth buffer, of the buffer zone 462 as discussed earlier. If any item in the operation environment 324 crosses any of the threshold including the first buffer through the fifth buffer being monitored and if the jog command 338 directs the movement of the robotic unit 310 along a path where a collision, a continued traversal of the buffer zone 462 of the robot model 528, or a combination thereof will lead to a collision, then there is a potential for a collision and the flow can pass to the command flag module 512.

It has been discovered that the embodiments as examples improve the efficiency of operation and detecting potential collision and avoid detecting false detection of collision by providing the robot model 528 with the threshold distance 464 of the buffer zone 462 or the threshold distance 464 that is greater than physical measurements of the robotic unit 310 to provide the benefit of extra time for the collision check calculations to complete and reduce processing time, bandwidth, or a combination thereof. Even though the buffer zone 462 is colliding with the items 126 in the operation environment 324, the robotic unit 310 itself can still be collision free.

It has been also discovered that the embodiments as examples improve the efficiency of detecting potential collision by being able to size or resize the buffer zone 462 around the robotic unit 310. The robot model 528 can include the buffer zone 462 to be larger for less complexity of the operation environment 324 represented by the environment model 526, thereby reducing the processing time for traversal of the buffer zone 462 when there are very few or no number of the items 126 in the operation environment 324 that can impede the motion of the robotic unit 310. On the other hand, the robot model 528 can include the buffer zone 462 to be smaller or reduce the threshold distance 464 for more complex type of the operation environment 324 represented by the environment model 526, thereby not over-constraining the movement of the robotic unit 310 as well as reducing the processing time for traversal of the buffer zone 462 when there are many number of the items 126 in the operation environment 324 that can impede the motion of the robotic unit 310.

If an instance of the items 126 in the operation environment 324 crosses the buffer zone 462, or as a more specific example any of the first buffer through the fifth buffer being monitored, and that instance of the items 126 not already found in the environment model 526 for the operation environment 324, then the model update module 506 can update the environment model 526 with the additional information. The additional information can also be passed along to command flag module 512.

If the robotic system 300, the controller 312, the sensor unit 230, or a combination thereof does not detect a traversal of the buffer zone 462 or the path of the jog command 338 does not lead to the collision 128, then the jog command 338 is determined not be result in the collision 128 with the items 126, known or unknown, in the operation environment 324. In this situation, the flow can pass to the command confirmation module 514.

For illustrative purposes, the robotic system 300 is described for determining an instance of the jog command 338 that can lead to the collision 128 based on the traversal of the buffer zone 462 and the path of the jog command 338, although it is understood that the robotic system 300 can operate differently. For example, the robotic system 300, the controller 312, the robotic unit 310, the sensor unit 230, or a combination thereof can determine a potential occurrence of the collision 128 for the jog command 338 without traversing the path of the robotic unit 310 as part of the determination. In this example, the traversal of the buffer zone 462 alone can indicate the collision 128 or potential collision based on the jog command 338. Continuing with this example, the robotic system 300, the controller 312, the robotic unit 310, the sensor unit 230, or a combination thereof can resize the buffer zone 462 or any of the first buffer through the fifth buffer such that the path based off the jog command 338 is not included in the determination of the collision or potential collision.

Continuing with the command flag module 512, the command flag module 512 provides action for the robotic unit 310 based on a traversal of the buffer zone 462 or any one of the segments from the first buffer to the fifth buffer being monitored. The command flag module 512 can take a number of actions.

For example, the command flag module 512 can provide generate a warning. The warning can be delivered to the user interface 216. The warning can include a haptic feedback, audio feedback, display feedback, or a combination thereof to the user interface 216 to notify a user to discontinue the invocation of the jog command 338, to invoke the end command 530, or a combination thereof. The warning can include information about the items 126 detected by the proximity readings of the sensor unit 230. The warning can provide which of the sensor unit 230 from the first sensor of FIG. 4 to the fifth sensor of FIG. 4 that detected a proximity traversal to the first buffer to the fifth buffer, respectively. The warning can also provide information for any of the items 126 detected that is not found in the environment model 526 for the operation environment 324.

Also for example, the command flag module 512 can also terminate the jog command 338 instead of, before, during, or after the generation and deliver of the warning. There can be situations where the robotic system 300, the robotic unit 310, the controller 312, or a combination thereof can determine the need to terminate the jog command 338.

For illustrative purposes, the example of the control flow shown in FIG. 5 depicts the flow terminating at the command flag module 512, although it is understood that the robotic system 300, the controller 312, the robotic unit 310, or a combination thereof can function differently. For example, the flow can allow an override of the warning or termination of the jog command 338. Also for example, the flow can allow for the items 126 to be removed allowing for the jog command 338 to continue and the flow can progress to the command confirmation module 514.

The command confirmation module 514 can generate an unobstructed status 532 that the jog command 338 being process has been determined by the robotic system 300, the controller 312, the robotic unit 310, the sensor unit 230, or a combination thereof is collision free. The command confirmation module 514 can determine the unobstructed status 532 when the jog command 338 will not result in the collision 128 by the robotic unit 310 within the operation environment 324 as provided by the environment model 526, including inadvertent physical contact by a portion of the robotic unit 310 to another portion of the robotic unit 310 that is not part of the jog command 338. The flow can progress to the command transfer module 516.

Returning to the calculation limit module 510, the calculation limit module 510 can determine if the collision check function through the collision check thread 522 has exceeded a collision check time limit 534. As an example, the robotic system 300, the controller 312, or a combination thereof can provide instructions or commands, such as the jog command 338, to the robotic unit 310 at the control intervals 472. The control intervals 472 represent the frequency at which commands are sent to the robotic unit 310. The value for each of the control intervals 472 can differ for the different types of the robotic unit 310 or different configuration for the robotic unit 310. For example, the robotic system 300, the controller 312, the user, or a combination thereof can configure the value the control intervals 472 for some operations to different durations, such as 2 milliseconds (ms), 4 ms, or 6 ms. Also for example, for other operations the control intervals 472 cannot be modified.

As an example for the values the control intervals 472 being 2 ms, the robotic system 300, the controller 312, or a combination thereof can send the jogging instructions for the jog command 338 at 2 m intervals. The jog command 338 can be sent to the jog operation thread 524, as an example, for calculating values for the joints 342 or the actuation unit 220 of FIG. 2 for the robotic unit 310, which can include instruction for direction, position, the speed 466, or a combination thereof, every 2 ms according to the control or command inputs by the operator/user. Calculations are performed for every instance of the joints 342 that will move to follow the jogging instruction or the jog command 338. For example, if the jog command 338 is to move one of the links 340 in a direction, joint values will need to be calculated for each of the joints 342 to make that motion occur. The joint values can be calculated for each of the joints 342 that will actually move to execute the jog command 338.

To continue the example, in order to prevent the collision 128 between the robotic unit 310 and the items 126 in the operation environment 324, the robotic system 300, the controller 312, or a combination thereof can perform real-time collision checking with the collision check thread 522 in parallel during each of the control intervals 472.

Also for example, the robotic system 300, the controller 312, or a combination thereof can perform the collision check to verify that the jog command 338 for a current instance of the control intervals 472 will not result in a collision. If a collision would occur, the robotic system 300, the controller 312, the collision check module 508, the command flag module 512, or a combination thereof can reject the jog command 338, terminate the jogging operation, or a combination thereof.

For examples when the robotic system 300, the controller 312, the collision check thread 522, or a combination thereof cannot complete the collision check, such as with the collision check module 508, in one instance of the control intervals 472, the calculation limit module 510 can determine an incomplete collision check for the jog command 338 and the flow can progress to the command flag module 512. As an example, a complexity of the operation environment 324, the environment model 526, or a combination thereof can lead to an incomplete collision check due to limitations of processing bandwidth.

To avoid situations where an incomplete collision check will cause termination of the jogging operation based on the jog command 338, the robotic system 300, the controller 312, or a combination thereof operates the collision check thread 522 dedicated to collision checking, environment modeling or updating with the model update module 506, or a combination thereof that is separate or independent from and in parallel with the jog operation thread 524.

As a specific example, the operation environment 324 around the robotic unit 310 does not change frequently and does not need to be updated during every instance of the control intervals 472. The robotic unit 310 receiving the jog command 338 can be included as part of the environment model 526 since the environment model 526 is also used during collision checking also accounts for the robotic unit 310 with respect to the operation environment 324.

In another example, the robotic system 300, the controller 312, or a combination thereof can operate in the operation environment 324 that is more complex with dynamic objects, such as the door 336 of FIG. 3 that can open and close or other moving robots, the environment model 526 can be more complex such that the collision check calculations by the collision check module 508 can take multiple instances of the control intervals 472 to complete. In situations where the collision check calculations are not completed within a single instances of the control intervals 472, the robotic system 300, the controller 312, the user interface 216, or a combination thereof can continue providing the jog command 338 to the robotic unit 310 until the collision check time limit 534 has been reached as determined by the calculation limit module 510.

Continuing the example, the collision check time limit 534 can be the number of the control intervals 472, such as a total time period as 4 ms or two instances of the control intervals 472 or 6 ms or three instances of the control intervals 472, until which a possible collision can occur. In some embodiments, the collision check time limit 534 can be based on a robot model 528 for the robotic unit 310. If the collision check time limit 534 is reached without a response for the unobstructed status 532 from the collision check thread 522, the robotic system 300, the controller 312, or a combination thereof can determine that a collision will occur and can terminate the jogging operation for the jog command 338 with the flow progressing to the command flag module 512.

It has been further discovered that the embodiments as examples improve the efficiency of the robotic system 300 to accurately and reliably avoid the collision 128 by the robotic unit 310 through the use of the sensor unit 230 attached to the robotic unit 310. The sensor unit 230 can include proximity sensors to provide the sensor readings 246 indicating any traversal of the proximity range generated by the buffer zone 462. Since collision analysis by the collision check module 508 is performed on a short time frame, such as 2 ms or within the collision check time limit 534 determined by the calculation limit module 510, the information from the sensor readings 246 is processed in real-time and with a very short window. The embodiments do not need detailed models, such as detailed vision information, based on three-dimensional point cloud information, and positions of the items 126 for the environment model 526. The embodiments operate by determining if an item exists in the jogging path with the use the sensor unit 230 as proximity sensors attached to the robotic unit 310, the links 340, the joints 342, or a combination thereof. Cameras can also be used as visual confirmation or additional validation to verify collision or potential collision, information in the environment model 526, or to update the environment model 526.

It has been still further discovered that the embodiments as examples improves the function of the manual operation of the robotic unit 310 by dynamically updating the environment model 526 as well as the robot model 528. As the operation environment 324 is changed, the embodiments can detect traversal to the buffer zone 462 and if the item is not expected, the environment model 526 can be updated based on the traversal of the buffer zone 462. The environment model 526 can be continued to be refined as additional information is received by additional traversal of the buffer zone 462 or the segments of the buffer zone 462 for the same or different instance of the items 126 in the operation environment 324.

It has been yet further discovered that the embodiments as examples improve the function and efficiency of manual operation of the robotic unit 310 by parallel processing of the collision check thread 522 and the jog operation thread 524 in real-time. The real-time collision checking provides the robotic system 300 the benefits of continuing to provide the jog command 338 to the robotic unit 310 while performing the collision checks, which can include generating or updating the environment model 526 that describes the operation environment 324 around the robotic unit 310 and the robotic unit 310 itself with respect to the operation environment 324, even if a calculation period for the collision check calculations exceed an instance of the control intervals 472. For example, in situations where the operation environment 324 does not include a significant number of obstacles or the items 126, such as and empty room with large distance between the robotic unit 310 and walls or in a static environment), then the collision check thread 522 can more likely generate the environment model 526 and perform the collision check calculations within one of the control intervals 472.

The flow can progress from the calculation limit module 510 to the command transfer module 516. The command transfer module 516 determines the jog command 338 being invoked can continue to be processed by the robotic unit 310. As an example, the command transfer module 516 determines that the jog command 338 being invoked has been confirmed by the command confirmation module 514 that the collision check thread 522, the collision check module 508, or a combination thereof determines that movement of the robotic unit 310 based on the jog command 338 being analyzed should be collision free.

Continuing the example, the command transfer module 516 can determine that the jog command 338 should be collision free based on the unobstructed status 532. The command transfer module 516 can transmit the jog command 338 to the robotic unit 310 for execution based on the unobstructed status 532 provided by the collision check thread 522 before the jog operation thread 524 reached the collision check time limit 534. The flow can progress to the mode check module 518.

The mode check module 518 determines if the robotic system 300, the controller 312, the robotic unit 310 is still in manual operation mode. The mode check module 518 will determine if the robotic unit 310 can accept another invocation of another manual command or the jog command 338. If so, the flow loops back to the command reception module 504. If not, the flow can progress to the mode termination module 520.

The mode termination module 520 prohibits the manual operation of the robotic unit 310. For example, the mode termination module 520 can reject or prevent execution of manual commands or further invocation of the jog command 338 provided by the user interface 216.

For illustrative purposes, the control flow is described in FIG. 5 with the partition of modules and the functions for each of the modules, although it is understood that control flow can operate and be configured differently. For example, generation of the robot model 528 can be set to a default setting and need not be generated with the model generation module 502. Also for example, the command flag module 512 can flow to the mode check module 518 to move to accept the next manual operation command.

Figure 6:
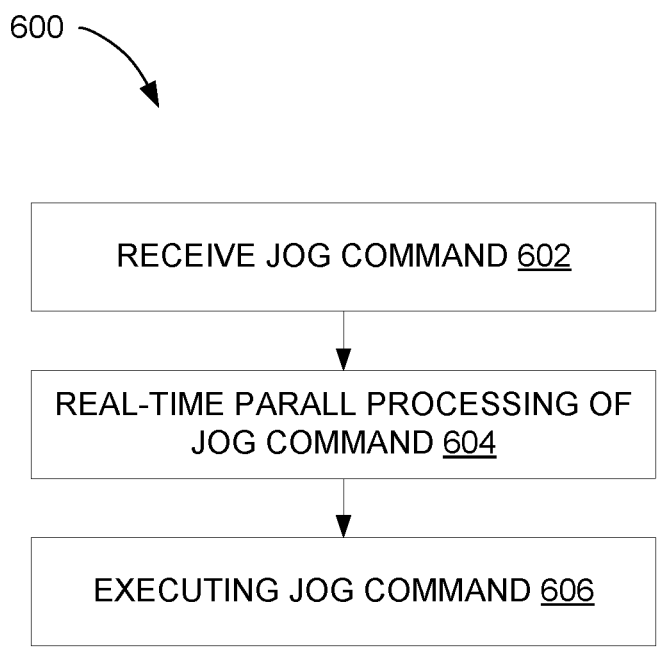
FIG. 6 is flow chart of a method of operation of a robotic system in an embodiment of the present invention.

Referring now to FIG. 6, therein is shown a flow chart of a method 600 of operation of a robotic system 300 in an embodiment of the present invention. The method 600 includes receiving a jog command for manually operating a robotic unit in a block 602; real-time parallel processing the jog command including: executing a collision check thread to determine whether the jog command results in a collision or results in an unobstructed status for the robotic unit within an operation environment based on an environment model and a robot model, executing a jog operation thread to determine whether the unobstructed status is provided within a collision check time limit in a block 604; and executing the jog command by the robotic unit based on the unobstructed status provided before the collision check time limit in a block 606.

The method 600 further comprise generating the robot model representing the robotic unit with including a buffer zone surrounding the robotic unit; generating the environment model representing the operation environment including the robotic unit; and wherein executing the collision check thread to determine whether the jog command results in the collision includes determining a representation of an item in the environment model entering the buffer zone.

The method 600 include executing the collision check thread to determine whether the jog command results in the collision includes traversing the buffer zone without a representation of an item included in the environment model for the operation environment, further comprising updating the environment model with the representation of the item.

The method 600 further comprise resizing the buffer zone based on the environment model representing the operation environment as non-complex.

The method 600 further comprise generating the robot model of the robotic unit, the robot model including a buffer zone surrounding the robotic unit; wherein modeling the robotic unit includes: modeling a link and a joint, modeling a first buffer for the link and the joint; and executing the collision check thread to determine whether the jog command results in the collision includes determining an item in the environment model enters the first buffer.

The method 600 further comprise generating the environment model as complex for the operation environment; and reducing a size of the buffer zone based on the environment model being complex.

The method 600 further comprise terminating the jog command by the robotic unit based on the unobstructed status not being provided before the collision check time limit.

The resulting method, process, apparatus, device, product, and/or system is cost-effective, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A robotic system comprising:
   a user interface configured to receive a jog command for manually operating a robotic unit;
   a control unit, coupled to the user interface, configured to:
   real-time parallel process the jog command by concurrently executing a collision check thread and a jog operation thread including to:
   execute the collision check thread to determine whether the jog command results in a collision or results in an unobstructed status for the robotic unit within an operation environment based on an environment model and a robot model, and
   execute the jog operation thread to determine whether the unobstructed status is provided within a collision check time limit; and
   execute the jog command for the robotic unit based on the unobstructed status provided before the collision check time limit includes termination of the jog command based on a warning of the proximity reading of a sensor unit.

2. The system as claimed in claim 1 wherein the control unit is further configured to:
   generate the robot model representing the robotic unit, the robot model including a buffer zone surrounding the robotic unit;
   generate the environment model representing the operation environment including the robotic unit; and
   execute the collision check thread to determine whether the jog command results in the collision including to determine whether an item in the environment model enters the buffer zone.

3. The system as claimed in claim 1 wherein the control unit is further configured to:
   execute the collision check thread to determine whether the jog command results in the collision including to determine whether an item enters a buffer zone, wherein the item is not included in the environment model of the operation environment; and
   update the environment model to include the item.

4. The system as claimed in claim 1 wherein the control unit is further configured to resize a buffer zone based on the environment model representing the operation environment as non-complex.

5. The system as claimed in claim 1 wherein the control unit is further configured to:
   generate the robot model representing the robotic unit, the robot model including:
   a buffer zone surrounding the robotic unit,
   a link and a joint of the robotic unit,
   a first buffer for the link and the joint; and
   execute the collision check thread to determine whether the jog command results in the collision including to determine whether an item in the environment model enters the first buffer.

6. The system as claimed in claim 1 wherein the control unit is further configured to:
   model the operation environment as complex with the environment model; and
   reduce a buffer zone based on the environment model being complex for the operation environment.

7. The system as claimed in claim 1 wherein the control unit is further configured to terminate the jog command for the robotic unit based on the unobstructed status not being provided before the collision check time limit.

8. A method of operation robotic system comprising:
   receiving a jog command for manually operating a robotic unit;
   real-time parallel processing the jog command by concurrently executing a collision check thread and a jog operation thread including:
   executing the collision check thread to determine whether the jog command results in a collision or results in an unobstructed status for the robotic unit within an operation environment based on an environment model and a robot model, and
   executing the jog operation thread to determine whether the unobstructed status is provided within a collision check time limit; and executing the jog command by the robotic unit based on the unobstructed status provided before the collision check time limit includes terminating the jog command based on a warning of the proximity reading of a sensor unit.

9. The method as claimed in claim 8 further comprising:
generating the robot model representing the robotic unit with including a buffer zone surrounding the robotic unit;
generating the environment model representing the operation environment including the robotic unit; and
wherein:
executing the collision check thread to determine whether the jog command results in the collision includes determining a representation of an item in the environment model entering the buffer zone.

10. The method as claimed in claim 8 wherein:
executing the collision check thread to determine whether the jog command results in the collision includes traversing a buffer zone without a representation of an item included in the environment model for the operation environment; and
further comprising:
updating the environment model with the representation of the item.

11. The method as claimed in claim 8 further comprising resizing a buffer zone based on the environment model representing the operation environment as non-complex.

12. The method as claimed in claim 8 further comprising:
generating the robot model representing the robotic unit, the robot model including a buffer zone surrounding the robotic unit;
wherein:
generating the robot model includes:
modeling a link and a joint,
modeling a first buffer for the link and the joint; and
executing the collision check thread to determine whether the jog command results in the collision includes determining an item in the environment model enters the first buffer.

13. The method as claimed in claim 8 further comprising:
generating the environment model as complex for the operation environment; and
reducing a size of a buffer zone based on the environment model being complex.

14. The method as claimed in claim 8 further comprising terminating the jog command by the robotic unit based on the unobstructed status not being provided before the collision check time limit.

15. A non-transitory computer readable medium including instructions executable by a control unit for a robotic system comprising:
receiving a jog command for manually operating a robotic unit;
real-time parallel processing of the jog command by concurrently executing a collision check thread and a jog operation thread including:
executing the collision check thread to determine whether the jog command results in a collision or results in an unobstructed status for the robotic unit within an operation environment based on an environment model and a robot model, and
executing the jog operation thread to determine whether the unobstructed status is provided within a collision check time limit; and
executing the jog command by the robotic unit based on the unobstructed status provided before the collision check time limit including terminating the jog command based on a warning of the proximity reading of a sensor unit.

16. The non-transitory computer readable medium as claimed in claim 15 further comprising:
generating the robot model representing the robotic unit with including a buffer zone surrounding the robotic unit;
generating the environment model representing the operation environment including the robotic unit; and
wherein:
executing the collision check thread to determine whether the jog command results in the collision includes determining a representation of an item in the environment model entering the buffer zone.

17. The non-transitory computer readable medium as claimed in claim 15 wherein:
executing the collision check thread to determine whether the jog command results in the collision includes traversing a buffer zone without a representation of an item included in the environment model for the operation environment; and
further comprising:
updating the environment model with the item.

18. The non-transitory computer readable medium as claimed in claim 15 further comprising resizing a buffer zone based on the environment model representing the operation environment as non-complex.

19. The non-transitory computer readable medium as claimed in claim 15 further comprising:
generating the robot model representing the robotic unit, the robot model including a buffer zone surrounding the robotic unit;
wherein:
generating the robot model includes:
modeling a link and a joint,
modeling a first buffer for the link and the joint; and
executing the collision check thread to determine whether the jog command results in the collision includes determining an item in the environment model enters the first buffer.

20. The non-transitory computer readable medium as claimed in claim 15 further comprising:
generating the environment model as complex for the operation environment; and
reducing a size of a buffer zone based on the environment model being complex.

\* \* \* \* \*